March 14, 1961  A. L. JANKENS ET AL  2,975,074
RESIN COATED PAPER
Filed Feb. 14, 1957

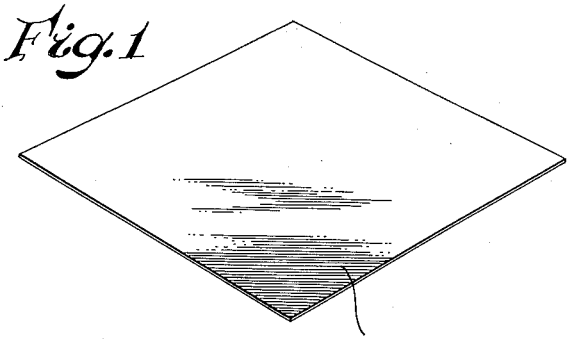

Fig. 1

Resin coated paper product comprised of a paper base having an intermediate coating of a chlorinated polyethylene resin and a superficial coating of a haloethylene polymer resin.

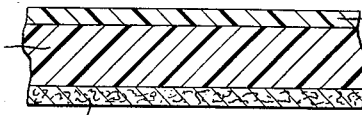

Fig. 2

Intermediate chlorinated polyethylene resin coating
Superficial haloethylene polymer coating
Paper base

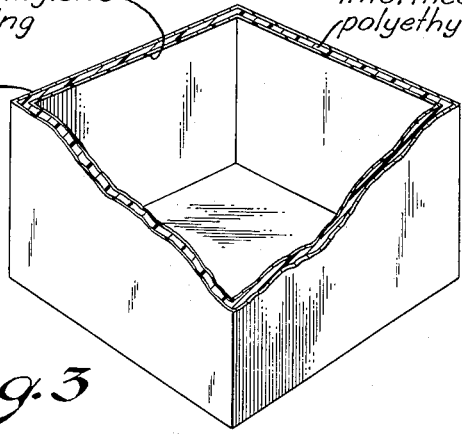

Fig. 3

Superficial haloethylene polymer coating
Intermediate chlorinated polyethylene resin coating
Paper base INVENTORS.
Austin L. Jankens
Fred D. Hoerger
BY
Griswold & Burdick
ATTORNEYS

United States Patent Office 2,975,074
Patented Mar. 14, 1961

2,975,074
RESIN COATED PAPER

Austin L. Jankens, Bay City, and Fred D. Hoerger, Midland, Mich., assignors to The Dow Chemical Company, Midland, Mich., a corporation of Delaware Filed Feb. 14, 1957, Ser. No. 640,290

16 Claims. (Cl. 117—76)

The chief aim and concern of the present invention is to provide new and improved resin or plastic coated paper products which have, among other desirable characteristics, exceptionally low water vapor and other gas and vapor transmitting properties. Such a product, as is apparent, has great utility (among other uses) as a wrapping material, especially for and in connection with various foodstuffs as well as being ideally suited for other packaging and protective wrapping purposes. The invention also relates to a method for providing such products.

In accordance with the present invention, superior resin coated paper products are comprised of a paper base over which has been coated an intermediate substrate layer of a chlorinated polyethylene resin that, beneficially, has a combined chlorine content between about 25 and 50 percent by weight, based on the weight of the halogenated polymer, and over which there is applied a superficial coating layer of a haloethylene (preferably a chloroethylene) polymer resin. Advantageously, the intermediate layer of chlorinated polyethylene has a combined chlorine content between about 30 and 45 percent by weight, with a value of from 35 to 40 percent by weight being even more advantageous in most instances and for a wide variety of purposes.

The coated paper products of the invention have properties and characteristics that are at least equivalent to the conventional wrapping materials that may be obtained by initially coating paper with a layer of ordinary polyethylene and then, after the surface of the first applied resin has been specially treated by various techniques and chemical modifications to adapt it for receipt of a saran resin coating, applying a superficial layer or top coat of such resin over the modified polyethylene surface. However, in the manufacture of the products of the invention, no special surface treatment of the intermediate chlorinated polymer resin layer is required before application of the final coating of the haloethylene polymer resin. The coated paper products of the present invention are strong, tough and flexible and remain so even at relatively low temperatures. They are possessed of a strong and effective bond between all of the individual contiguous constituents of the composite structure.

In general, they have good clarity and acceptable transparency, permitting printed paper stock to be satisfactorily employed in their fabrication. They are especially effective as wrappings for various foodstuffs, especially with meat, fowl, cheese and the like whose possible dehydration, when they have been packaged, may present a problem. The product may be employed with excellent results as a freezer wrap. In addition, its natural grease and oil resistance suits it well for packaging lard, fish and other oily products. It may also be used for bread, candy and the like and for other packaging purposes including packages in container form for such fluids as milk, fruits, juices and the like as well as for packaging non-edible products. A piece of resin coated paper is schematically depicted in perspective in Figure 1 and cross-sectionally in Figure 2 of the accompanying drawing. A coated paper container in accordance with the invention is fragmentarliy illustrated in Figure 3 of the drawing.

Any paper or paper stock suitable for wrapping purposes (as the type of paper stock or base that is conventionally utilized in the manufacture of waxed paper products) or for the fabrication of liquid or other containers and packages may advantageously be resin or plastic coated in accordance with the invention. The intermediate layer of the chlorinated polyethylene resin may be applied and coated by any conventional technique on the surface of the paper. Thus, calendering, knife spreading and the like techniques may be utilized with advantage for this purpose. The thickness of the intermediate layer is relatively non-critical and may be varied to best suit and meet the requirements of the particular composite article that is being fabricated. It has little, if any, bearing on the adhesion that is obtained between the constituents of the coated product. Of course, enough resin must be employed in the intermediate layer to compensate for any permeation of the paper base that may occur while providing an integral, enveloping intermediate substrate thereover. For most purposes, the intermediate chlorinated polyethylene resin layer need not have a thickness that exceeds about 20 mils or so. And, when coated wrapping paper and the like is being fabricated, it is generally beneficial for the average thickness of the intermediate chlorinated polyethylene resin layer to be between about 0.5 and 5 mils. The chlorinated polyethylene resin composition for the intermediate layer may be specially formulated with plasticizers, stabilizers and the like or it may be applied in an unmodified form over the paper base, as may be desired in particular instances.

The chlorinated polyethylene resin that is employed in the intermediate resin layer in the practice of the present invention may be derived by the chlorination of polyethylene of any nature according to any suitable halogenating technique including suspension, solution and direct chlorinations of the parent ethylene polymer. Thus, the parent polyethylenes from which the chlorinated resins are derived may, for example, be similar to those which are oftentimes known as "conventional high pressure polyethylenes" and which are sometimes referred to as being "polythenes." Such polymers may be obtained by polymerizing ethylene in a basic aqueous medium and in the presence of polymerization-favoring quantities of oxygen under high pressures in excess of 500 or 1,000 atmospheres at temperatures which may be between 150 and 275° C. Or, if desired, they may be similar to the essentially linear and unbranched polymers, some of which are known as being "low pressure polyethylenes," which have been referred to as "ultrathenes." Such linear polymers ordinarily have greater apparent molecular weights (as may be determined from such of their characteristics as melt viscosities and the like) in excess of about 40,000; densities of about 0.94–096 gram per cubic centimeter; and melting points at least in the neighborhod of 125–135° C. They are ordinarily found to have a more crystalline nature than conventional polyethylenes and may contain less than 3.0 and even less than 0.3 methyl radical per 100 methylene groups in the polymer molecule. The essentially linear and unbranched polymers of ethylene may be obtained under relatively low pressures of 1 to 100 atmospheres using such catalysts for polymerizing the ethylene as mixtures of strong reducing agents and compounds of group IV–B, V–B and VI–B metals of the periodic system; chromium oxide on silicated alumina; hexavalent molybdenum compounds; and charcoal supported nickel-cobalt.

The haloethylene polymer resin employed for coating the surface of the intermediate substrate layer of chlorinated polyethylene resin on the paper base may advantageously be polyvinylchloride or a copolymer of vinyl chloride and vinyl acetate containing at least about 80 percent by weight of vinyl chloride polymerized in the copolymer molecule. Or it may be a saran copolymer of vinylidene chloride and vinyl chloride, a saran copolymer of vinylidene chloride and acrylonitrile or a saran copolymer of vinylidene chloride and acrylic acid or its ester derivatives including methyl acrylate, ethyl acrylate and the like. It is particularly advantageous to employ crystalline saran copolymers and even more advantageous, in many instances, to utilize such copolymers of vinyl chloride and vinylidene chloride as may contain at least about 80 percent by weight of vinylidenechloride polymerized in the copolymer molecule or such copolymers of vinylidene chloride and acrylonitrile (vinyl cyanide) as may contain at least 60 and, preferably, from 85 to 95 percent by weight of vinylidene chloride polymerized in the copolymer molecule. Of course, the bromo, fluoro and mixed halogen analogs of the above polymers, especially those containing acidic hydrogen atoms, may also be employed suitably as the haloethylene polymer resins in the practice of the invention. As herein employed, and as it is intended to be construed in the hereto appended claims, the term "haloethylene" is intended to be exclusive of iodine-containing compounds.

The haloethylene polymer resins may be utilized suitably in several ways in order to obtain a superficial layer of the top coating resin on intermediate substrate layer of the chlorinated polyethylene resin that covers the paper base. They may be cast on the surface of the chlorinated polyethylene resin from a dissolved composition that has been formulated with suitable solvents, such as in lacquer formulations, or they may be deposited from latex compositions or with polymerizing mixtures of the monomeric substances which are polymerized in the haloethylene polymer resin. In order to secure better adhesion when latex compositions are employed, it may be beneficial to utilize a flame treatment or the like on the uncoated chlorinated polyethylene resin surface to augment its wettability. The casting may be accomplished by various spread, dip, brush or spray techniques. After their application, the haloethylene polymer resin compositions may be dried, cured or treated according to usual and conventional techniques to remove or countereffect solvents, vehicles or other admixed ingredients and to effect a solid deposition of the tightly adhering resin layer in the composite structure.

Advantageously, the casting of the haloethylene polymer resins to finish the coated paper products may be performed suitably by spread coating a dissolved or lacquer formulation of the haloethylene polymer resin over the intermediate layer of the chlorinated polyethylene resin. While different thicknesses may also be beneficial, it is desirable for the superficially applied layer of haloethylene polymer resin on the surface of the intermediate substrate layer of the chlorinated polyethylene resin to be at least about 0.02 mil thick and even more desirable for many applications for it to have a thickness between 0.1 and 2.0 mils. As is apparent, wrapping papers may, if desired, be coated on both of their surfaces in accordance with the invention. In a similar manner, all of the coatable surfaces of other articles such as both of the inner and outer surfaces of containers and the like or either surface or any desired portion of a particular paper base may, as desired, be provided with the intermediate chlorinated polyethylene resin and superficial haloethylene polymer resin coatings.

By way of illustration, separate specimens of wrapping paper were coated with intermediate layers of two different chlorinated polyethylene compositions using halogenated resins having different total combined chlorine contents. The chlorinated polyethylene has been obtained by halogenating an aqueous suspension of finely divided linear polyethylene. The chlorinated resins were each blended with about 2 percent by weight of a conventional plasticizer and 0.6 percent by weight of a conventional heat stabilizer. The chlorinated polyethylene compositions were then knife coated on the paper to form 2 mil intermediate layers which there then surface coated with about a 0.1 mil thick top coat of a copolymer of vinylidene chloride and acrylonitrile that contained about 89 percent by weight of vinylidene chloride polymerized in the copolymer molecule. The haloethylene polymer resin was applied to the surface of the coated paper from a lacquer composition with methyl ethyl ketone. After the coatings had dried on each of the samples that were prepared, the resulting structures were tested for the adhesive properties of the applied coatings on the paper base at room temperature by an adhesion test which comprised pressing about a one-half by six inch strip of conventional regenerated cellulose adhesive tape of the pressure-sensitive variety (such as that which is obtainable under the trade-name "Scotch Brand" from the Minnesota Mining and Manufacturing Company) on the coated surface and measuring, as closely as possible, the force in grams on the tape that was required to peel the superficially applied saran coating from the surface of the intermediate layer of chlorinated polyethylene resin. Due to the various factors involved, the accuracy of results in such a test is believed to fall within plus or minus 20 percent of the actual numerical values obtained. However, the test is valuable and reliable to a great extent to indicate the bonding efficiency between an applied coating and its substrate. In the following Table I there is given the relative adhesion values that were obtained in the testing for each of the coated paper samples which are also distinguished one from another by the combined halogen contents that were present in the chlorinated polyethylene intermediate layer substrates. The latter, incidentally, were strongly and firmly bonded to the paper base.

Table I.—*Adhesion of saran coating on paper base coated with intermediate layer of various chlorinated polyethylene resins*

| Sample | Percent by wt. of Combined Chlorine In Resin In Intermediate Layer | Relative adhesion In Grams of Saran Coating |
|---|---|---|
| "A" | 18 | 10 |
| "B" | 37 | 500 |

Similar results were obtained when the chlorinated polyethylene resin was employed in an unmodified form to provide the intermediate layer over the coated paper base.

In addition to the foregoing, various other chlorinated polyethylene resin substrates were coated and tested in the same manner as above to determine the efficacy of the bond obtained between various intermediate resins and the superficial saran coating. The results are set forth in the following Table II.

Table II.—*Adhesion of saran coating to intermediate substrate layers of various chlorinated polyethylene resins*

| Sample | Percent by Wt. of Combined Chlorine In Resin Substrate | Relative Adhesion In Grams Of Saran Coating |
|---|---|---|
| "C" | 27 | 100 |
| "D" | 30 | 150 |
| "E" a | 37 | 700 |
| "F" | 40 | 600 |
| "G" | 45 | 120 |
| "H" | 50 | 40 | a This resin was not the same as that employed in the intermediate layer of Sample "B" although it had about the same combined chlorine content.

In comparison with the above, a similar saran coating applied on plain polyethylene film can be stripped off in the same test with a force of only about 10 grams.

Besides the foregoing, the gas transmission of a 1 mil base chlorinated polyethylene film coated with 0.1 mil of the above saran resin was tested with oxygen and carbon dioxide so as to give an indication of the excellent barrier properties obtainable in the coated paper products of the invention. The transmission rates of the film sample with the gases were found to be only about 50 cubic centimeters of oxygen and 160 cubic centimeters of carbon dioxide at room temperature per 100 square inches of the film over a 24 hour period with one atmosphere of gas pressure differential across the film. In comparison, the rates for a plain 1 mil film of polyethylene were found to be about 240 cubic centimeters of oxygen and 1940 cubic centimeters of carbon dioxide by the same test.

All of the plastic coated paper products in accordance with the invention had good flexibility and were resistant to embrittlement at temperatures as low as $-20°$ C. Besides this, their effectiveness as water vapor barriers was commensurate to that which is obtainable from conventional saran films.

The foregoing excellent results may be duplicated when other paper base articles besides wrapping sheets, such as containers and the like, are superficially coated with other haloethylene polymer resin compositions using other types and varieties of chlorinated polyethylene resins for the intermediate substrate layers in the composite articles. Hence, the scope and purview of the invention is to be interpreted and construed in the light of the hereto appended claims rather than being strictly gauged from the foregoing illustrative description and specification.

What is claimed is:

1. As a composite structure, a resin coated paper product which comprises a paper base having a continuous intermediate substrate layer of a chlorinated polyethylene resin applied thereover, said chlorinated polyethylene resin in said intermediate layer having a combined chlorine content between about 25 and 50 percent by weight, based on the weight of the chlorinated resin, and a continuous tightly adhering superficial coating of a haloethylene polymer resin over the surface of said intermediate layer, said haloethylene polymer being comprised of a halogen of atomic number from 9 to 39 and selected from the group consisting of vinyl halide polymers that contain in the polymer molecule at least about 80 weight percent of a polymerized vinyl halide and vinylidene halide polymers that contain in the polymer molecule at least about 60 weight percent of polymerized vinylidene halide.

2. The composite structure of claim 1, wherein the combined halogen content of the halogenated polyethylene resin in the intermediate layer is between about 30 and 45 percent by weight.

3. The composite structure of claim 1, wherein the combined halogen content of the halogenated polyethylene resin in the intermediate layer is between about 35 and 40 percent by weight.

4. The composite structure of claim 1, wherein the tightly adhering superficial coating haloethylene polymer resin has a thickness between about 0.1 and 2 mils.

5. A wrapping paper product in accordance with the composite structure set forth in claim 4, wherein the thickness of the halogenated polyethylene resin in the intermediate substrate layer is not in excess of about 20 mils.

6. The composite structure of claim 1, wherein the haloethylene polymer resin is a copolymer of vinyl chloride and vinyl acetate.

7. The composite structure of claim 1, wherein the haloethylene polymer resin is a copolymer of vinylidene chloride and vinyl chloride.

8. The composite structure of claim 1, wherein the haloethylene polymer resin is a copolymer of vinylidene chloride and acrylonitrile.

9. The composite structure of claim 1, wherein the haloethylene polymer resin is a copolymer of vinylidene chloride and methyl acrylate.

10. The composite structure of claim 1, wherein the haloethylene polymer resin is a crystalline vinylidene chloride polymeric material.

11. Method for coating paper which comprises covering the surface of a paper base with a continuous intermediate substrate layer of a chlorinated polyethylene resin that has a combined halogen content, based on the weight of the chlorinated resin, between about 25 and 50 percent by weight, and subsequently coating the surface of the applied intermediate layer with a continuous superficial layer of a haloethylene polymer resin, said haloethylene polymer being comprised of a halogen of atomic number from 9 to 39 and selected from the group consisting of vinyl halide polymers that contain in the polymer molecule at least about 80 weight percent of a polymerized vinyl halide and vinylidene halide polymers that contain in the polymer molecule at least about 60 weight percent of polymerized vinylidene halide.

12. The method of claim 11, wherein the paper base is covered with an intermediate substrate layer of halogenated polyethylene having a combined halogen content between about 30 and 45 percent by weight.

13. The method of claim 12, wherein the paper base is covered with an intermediate substrate layer of halogenated polyethylene having a combined halogen content between about 35 and 40 percent by weight.

14. The method of claim 12, wherein the intermediate substrate layer of halogenated polyethylene resin has an average thickness that is not in excess of about 20 mils.

15. The method of claim 12, wherein the superficial layer of the haloethylene polymer resin has a thickness of at least about 0.02 mil.

16. The method of claim 12, wherein the superficial layer of the haloethylene polymer resin has an average thickness of between about 0.1 and 2 mils.

References Cited in the file of this patent

UNITED STATES PATENTS

| 2,364,410 | Whittaker | Dec. 5, 1944 |
| 2,392,972 | Cheyney | Jan. 15, 1946 |
| 2,631,947 | Kline et al. | Mar. 17, 1953 |
| 2,715,075 | Wolinski | Aug. 9, 1955 |
| 2,748,027 | Meier | May 29, 1956 |
| 2,801,447 | Wolinski | Aug. 6, 1957 |

FOREIGN PATENTS

| 129,806 | Australia | Nov. 28, 1946 |